(12) United States Patent
Dokuni

(10) Patent No.: US 7,973,987 B2
(45) Date of Patent: Jul. 5, 2011

(54) IMAGE COPYING APPARATUS AND METHOD OF CORRECTING IMAGE DATA

(75) Inventor: Kenji Dokuni, Kyoto (JP)

(73) Assignee: Murata Machinery, Ltd., Kyoto (JP)

(*) Notice: Subject to any disclaimer, the term of this patent is extended or adjusted under 35 U.S.C. 154(b) by 652 days.

(21) Appl. No.: 12/099,859

(22) Filed: Apr. 9, 2008

(65) Prior Publication Data

US 2008/0266615 A1 Oct. 30, 2008

(30) Foreign Application Priority Data

Apr. 24, 2007 (JP) ................. 2007-113601

(51) Int. Cl.
*G03F 3/08* (2006.01)
(52) U.S. Cl. ........ 358/518; 358/408; 358/474; 358/504; 358/505
(58) Field of Classification Search .......... 358/504, 358/505, 518, 408, 474
See application file for complete search history.

(56) References Cited

U.S. PATENT DOCUMENTS

| 6,048,117 A * | 4/2000 | Banton ............ 400/120.09 |
| 2008/0068682 A1 | 3/2008 | Morikawa |
| 2008/0180706 A1 | 7/2008 | Yanagi |

FOREIGN PATENT DOCUMENTS

| EP | 1 349 374 A1 | 10/2003 |
| EP | 1349374 A1 * | 10/2003 |
| JP | 2003-032504 A | 1/2003 |
| JP | 2004-357074 A | 12/2004 |
| JP | 2005-304092 A | 10/2005 |
| JP | 2005304092 A * | 10/2005 |
| JP | 2006-092324 A | 4/2006 |
| JP | 2006-217192 A | 8/2006 |
| JP | 2008-187466 A | 8/2008 |

OTHER PUBLICATIONS

Official communication issued in counterpart Japanese Application No. 2007-113601, mailed on Apr. 14, 2009.
Official communication issued in counterpart European Application No. 08006095.7, mailed on Aug. 7, 2008.

* cited by examiner

*Primary Examiner* — Chan S Park
*Assistant Examiner* — Jamares Washington
(74) *Attorney, Agent, or Firm* — Keating & Bennett, LLP

(57) ABSTRACT

An image copying apparatus includes a target data acquiring unit, a target data saving unit, an adding unit, a sampling data saving unit, a specifying unit, a sampling data saving unit, and a correcting unit. The target data acquiring unit acquires target data from a test chart document. The adding unit adds data displaying a specification image specifying the scanning unit having scanned a test chart recorded side to the recorded side image data. The sampling data acquiring unit acquires sampling data from a copy of the test chart document. The specifying unit specifies the scanning unit having scanned the test chart recorded side from the specification image. The sampling data saving unit saves the sampling data when the scanning unit having scanned the test chart copied side matches the specified scanning unit. The correcting unit corrects the image data based on a correcting feature generated from the saved data.

8 Claims, 9 Drawing Sheets

US 7,973,987 B2

IMAGE COPYING APPARATUS AND METHOD OF CORRECTING IMAGE DATA

CROSS-REFERENCE TO RELATED APPLICATIONS

This application claims priority under 35 U.S.C. 119 to Japanese Patent Application No. 2007-113601, filed on Apr. 24, 2007, which application is hereby incorporated by reference in its entirety.

BACKGROUND OF THE INVENTION

1. Field of the Invention

The present invention relates to an image copying apparatus and a method of correcting image data in the image copying apparatus.

2. Description of the Related Art

In an image copying apparatus operable to copy a document by including a front side scanning unit for scanning a front side of the document and a reverse side scanning unit for scanning a reverse side of the document, to scan both sides of the document at once, and to form an image on a recording medium in accordance with image data generated by the front side scanning unit or the reverse side scanning unit, it is required to correct the image data in response to the scanning unit which scans the document in order to adequately reproduce the colors when copying.

In order to achieve an adequate correction of the image data, it is common to calibrate the image copying apparatus by having the apparatus scan a test chart and a copy thereof.

In the image copying apparatus, it is known that the image data generated by the front side scanning unit and the image data generated by the reverse side scanning unit are corrected.

However, in the conventional image copying apparatus, troublesome operations such as specifying the scanning unit for scanning the test chart or the copy thereof are required when carrying out the calibration.

SUMMARY OF THE INVENTION

In order to solve the problems described above, preferred embodiments of the present invention provide an image copying apparatus which is able to be adequately calibrated without requiring complicated operations.

An image copying apparatus according to a preferred embodiment of the present invention preferably includes an image scanning unit, an image forming unit, a target data acquiring unit, a target data saving unit, an adding unit, a sampling data acquiring unit, a specifying unit, a sampling data saving unit, and a correcting unit. The image scanning unit includes a first scanning unit and a second scanning unit. The first scanning unit scans a first side of a document and generates image data. The second scanning unit scans a second side of the document and generates image data. The image forming unit forms an image on a recording medium in accordance with the image data generated by the image scanning unit. The target data acquiring unit acquires target data from recorded side image data generated by the image scanning unit by scanning a test chart recorded side of a test chart document. The target data saving unit saves the target data. The adding unit adds data displaying a specification image which specifies the scanning unit that has scanned the test chart recorded side to the recorded side image data. The sampling data acquiring unit acquires sampling data from copied side image data generated by the image scanning unit by scanning a test chart copied side of a copy of the test chart document, that is, the side of a copy of the test chart document containing the test chart. The specifying unit specifies the scanning unit that has scanned the test chart recorded side from a portion of the specification image of the copied side image data. The sampling data saving unit saves, when the scanning unit that has scanned the test chart copied side matches the scanning unit specified by the specifying unit, the sampling data acquired by the sampling data acquiring unit. The correcting unit corrects the image data generated when a normal document is copied, on the basis of a correcting feature generated from the target data saved in the target data saving unit and the sampling data saved in the sampling data saving unit.

According to the various preferred embodiments of the present invention, calibration is adequately achieved without requiring complicated operations.

According to a preferred embodiment of the present invention, the adding unit preferably adds data displaying a specification image specifying the date and time when the test chart recorded side was scanned to the recorded side image data. The specifying unit specifies the date and time when the test chart recorded side was scanned from a portion of the specification image of the copied side image data. The sampling data saving unit saves, when a number of days and time elapsed from the date and time specified by the specifying unit are within a predetermined standard, the sampling data acquired by the sampling data acquiring unit. Accordingly, calibration using a copy of the test chart document with the elapsed days and time exceeding the predetermined standard is prevented.

According to a preferred embodiment of the present invention, the adding unit preferably adds data displaying a specification image for specifying an image scanning unit of the image copying apparatus that has scanned the test chart recorded side, to the recorded side image data. The specifying unit specifies the image scanning unit of the image copying apparatus that has scanned the test chart recorded side from a portion of the specification image of the copied side image data. The sampling data saving unit saves, when the image scanning unit of the image copying apparatus that has scanned the test chart copied side matches the image scanning unit of the image copying apparatus specified by the specifying unit, the sampling data acquired by the sampling data acquiring unit. Accordingly, calibration using a copy of a test chart document acquired by a different image scanning unit of the image copying apparatus is prevented.

According to another preferred embodiment of the present invention, a method of correcting image data in an image copying apparatus including an image scanning unit and an image forming unit is provided. The image scanning unit preferably includes a first scanning unit and a second scanning unit. The first scanning unit generates image data by scanning a first side of a document. The second scanning unit generates image data by scanning a second side of the document. The image forming unit forms an image on a recording medium in accordance with the image data generated by the image scanning unit. A method of correcting the image data includes a target data acquiring step, a target data saving step, an adding step, a sampling data acquiring step, a specifying step, a sampling data saving step, and a correcting step. The target data acquiring step acquires target data from recorded side image data generated by the image scanning unit by scanning a test chart recorded side of a test chart document. The target data saving step saves the target data. The adding step adds data displaying a specification image specifying the scanning unit that has scanned the test chart recorded side to the recorded side image data. The sampling data acquiring step acquires sampling data from copied side image data generated by the image scanning unit by scanning a test chart copied side of a copy of the test chart document. The specifying step specifies the scanning unit that has scanned the test chart recorded side from a portion of the specification image of the copied side image data. The sampling data saving step saves, when the scanning unit that has scanned the test chart copied side matches the scanning unit specified in the specifying step, the sampling data acquired in the sampling data acquiring step. The correcting step includes a correcting step for correcting the image data generated when a normal document is copied, on the basis of a correcting feature generated from the target data saved in the target data saving step and the sampling data saved in the sampling data saving step.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

1. Configuration of the Digital Multifunction Peripheral

Figure 1:
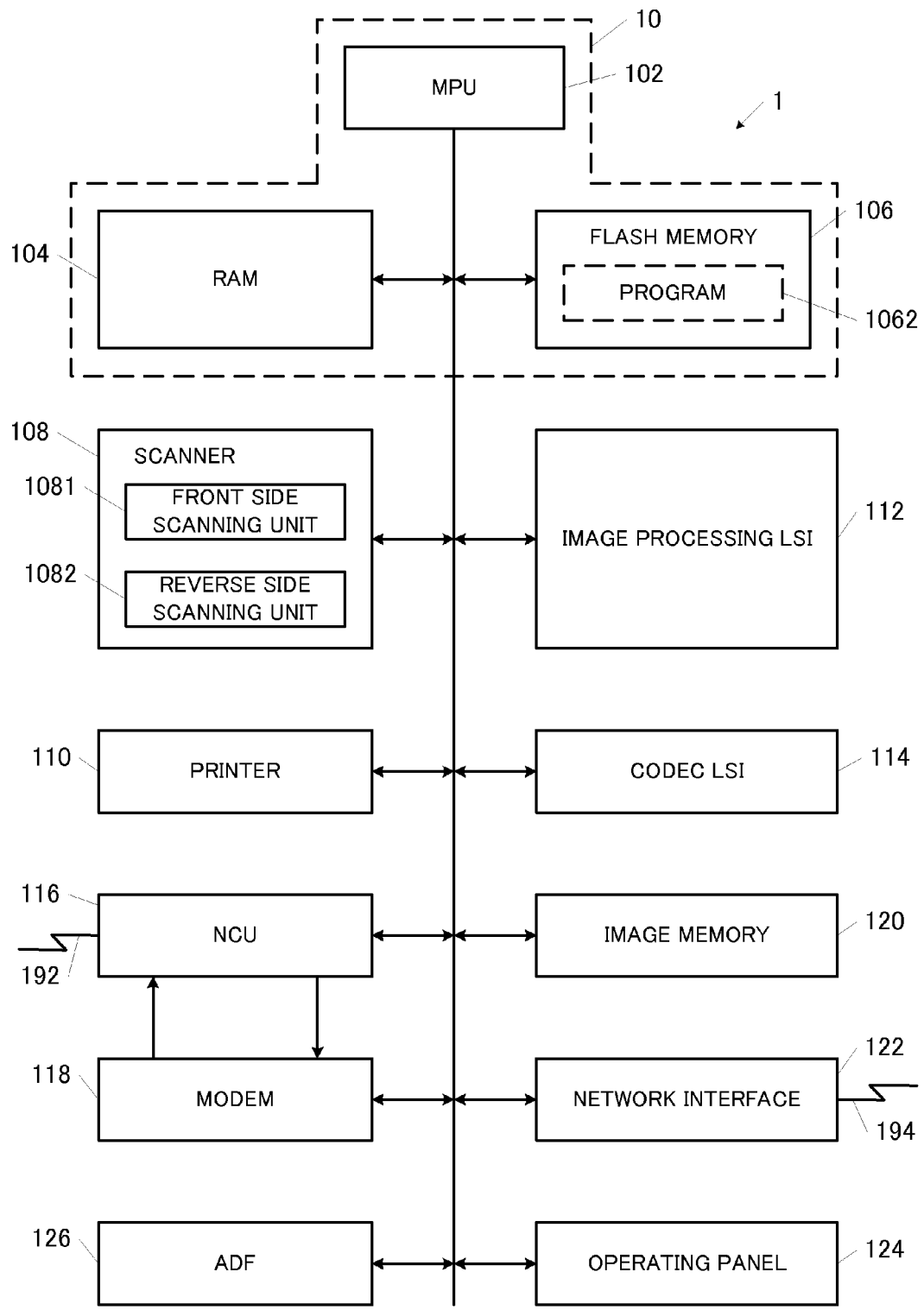
FIG. 1 is a block diagram illustrating a digital multifunction peripheral.

FIG. 1 is a block diagram illustrating a configuration of a digital multifunction peripheral 1 according to a preferred embodiment of the present invention. The digital multifunction peripheral 1 is also referred to as an MFP, and has a facsimile function, a copying function, a scanning function, and a printing function.

As shown in FIG. 1, the digital multifunction peripheral 1 includes a Micro Processing Unit (MPU) 102, a Random Access Memory (RAM: main memory device) 104, and a flash memory (auxiliary memory device) 106 as components of an integrated computer 10. The MPU 102 integrally controls each component of the digital multifunction peripheral 1 according to a program 1062 saved in the flash memory 106. The program 1062 is loaded in the RAM 104, and data required for executing the program 1062 is saved in the RAM 104.

The digital multifunction peripheral 1 includes a scanner 108, a printer 110, an image processing Large Scale Integration (LSI) 112, a codec LSI 114, a network control unit (NCU) 116, a modem 118, an image memory 120, a network interface 122, an operating panel 124, and an Automatic Document Feeder (ADF) 126.

The scanner 108 scans a supplied document and generates image data. The scanner 108 includes a front side scanning unit 1081 arranged to scan a front side of the document and a reverse side scanning unit 1082 arranged to scan a reverse side of the document, wherein the units 1081 and 1082 are arranged independently. Accordingly, the scanner 108 is able to scan both sides of the document at once, that is, the scanner 108 can scan both sides of the document without feeding back the document. The digital multifunction peripheral 1 can also scan only the front side of the document by using only the front side scanning unit 1081 or scan only the reverse side of the document by using only the reverse side scanning unit 1082.

The printer 110 forms an image on a recording medium such as a recording sheet in accordance with the image data by an electrophotographic system, for example.

The image processing LSI 112 processes the image data. It is also possible to implement a portion of or all of the functions of the image processing LSI 112 by executing the program 1062 with the integrated computer 10.

The codec LSI 114 codes or decodes the image data by a Modified Halfman (MH) format, a Modified Read (MR) format, a Modified Modified Read (MMR) format, or a Joint Photographic Experts Group (JPEG) format. It is also possible to implement a portion of or all of the functions of the codec LSI 114 by executing the program 1062 with the integrated computer 10.

The NCU 116 controls connection to a public telephone switched network 192. The NCU 116 sends a dial signal corresponding to the telephone number of a destination and detects incoming calls. The modem 118 modulates or demodulates the image data.

The image memory 120 stores the image data to be processed by the digital multifunction peripheral 1. The image memory 120 preferably includes a Synchronous Dynamic Random Access Memory (SDRAM) or the like.

The network interface 122 connects the digital multifunction peripheral 1 to a network 194.

The operating panel 124 detects an operation input by an operator and displays various information.

The ADF 126 picks up the document one-by-one from a document group placed on a document platen and feeds the documents to the scanner 108. The term "document group" may be a plurality of sheets of documents, or may be a single document sheet.

When the digital multifunction peripheral 1 transmits the document in a facsimile mode, the scanner 108 scans the document first to generate the image data. Subsequently, the codec LSI 114 codes the image data generated by the scanner 108. Then, the modem 118 modulates the image data coded by the codec LSI 114 and transmits the data to a facsimile machine of the destination. When the digital multifunction peripheral 1 receives image data in the facsimile mode, the modem 118 receives the image data from the facsimile machine of the destination and demodulates the data. Subsequently, the codec LSI 114 decodes the image data demodulated by the modem 118. Then, the printer 110 forms the image on the recording medium in accordance with the image data decoded by the codec LSI 114.

In a copy mode of the digital multifunction peripheral 1, the scanner 108 (the front side scanning unit 1081 or the reverse side scanning unit 1082) scans the document and generates the image data, and the printer 110 forms the image on the recording medium in accordance with the image data generated by the scanner 108.

In a scan mode of the digital multifunction peripheral 1, the scanner 108 scans the document and generates the image data, the codec LSI 114 codes the image data generated by the scanner 108, and the network interface 122 transmits the image data coded by the codec LSI 114 to a personal computer of the destination.

In a print mode, the network interface 122 receives the image data from the personal computer of the destination, the codec LSI 114 decodes the image data received by the network interface 122, and the printer 110 forms the image on the recording medium in accordance with the image data decoded by the codec LSI 114.

2. Test Chart Document

Figure 2:
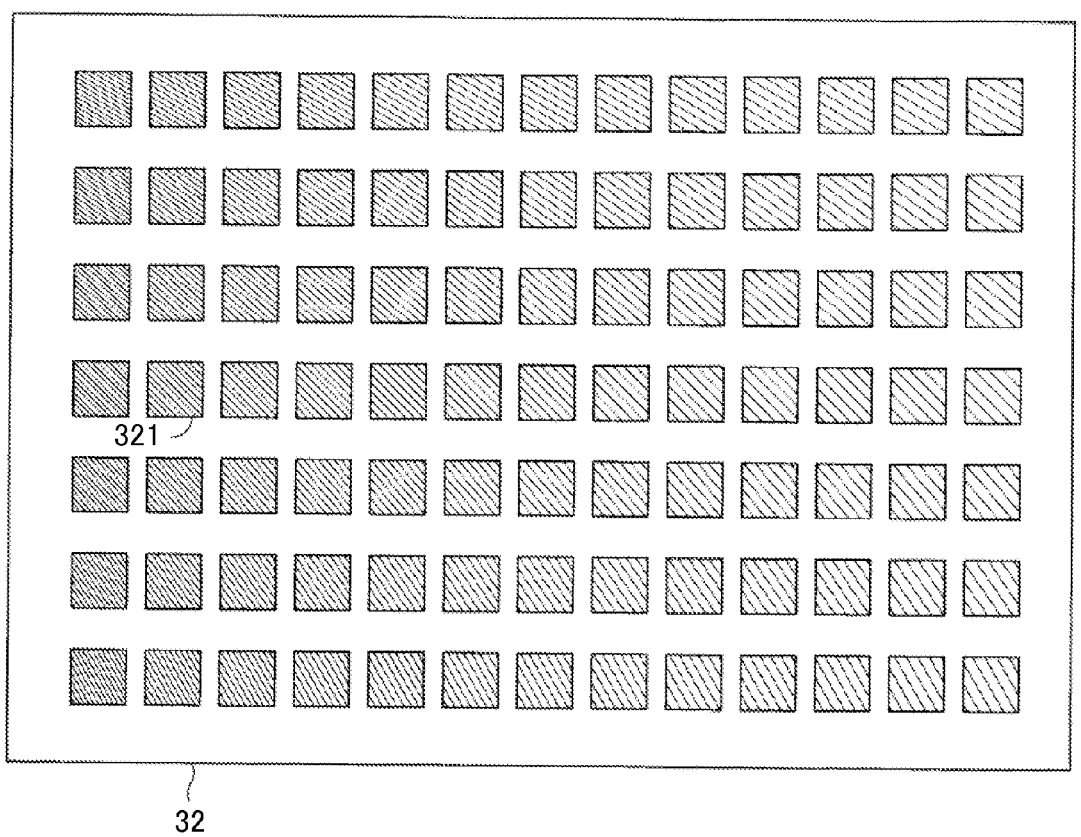
FIG. 2 illustrates an example of a test chart document.

FIG. 2 is a schematic view illustrating an example of a test chart document used for calibration. A test chart document 32, as shown in FIG. 2, is a document having a test chart recorded on one side thereof. The test chart includes a plurality of patches 321 which are changed in tone step-by-step and arranged in rows in a secondary scanning direction. It is also possible to use a test chart document of a type different from the test chart document 32 exemplified in FIG. 2.

The digital multifunction peripheral 1 scans a test chart recorded side of the test chart document to acquire target data, scans a test chart copied side of a copy of the test chart document to acquire sampling data, and generates a correction feature which brings the sampling data close to the target data or, preferably, matches the sampling data to the target data. By correcting the image data by the correction feature, the colors of the document are accurately reproduced on a copy when a normal document is copied. When the test chart document 32 in FIG. 2 is used, density data of the patches 321 portion acquired from the image data generated by the front side scanning unit 1081 or the reverse side scanning unit 1082 by scanning the test chart recorded side may be used as the target data. The density data of the patches 321 acquired from the image data generated by the front side scanning unit 1081 or the reverse side scanning unit 1082 by scanning the test chart copied side may also be used as the sampling data.

3. Target Data Acquiring Mode

Figure 3:
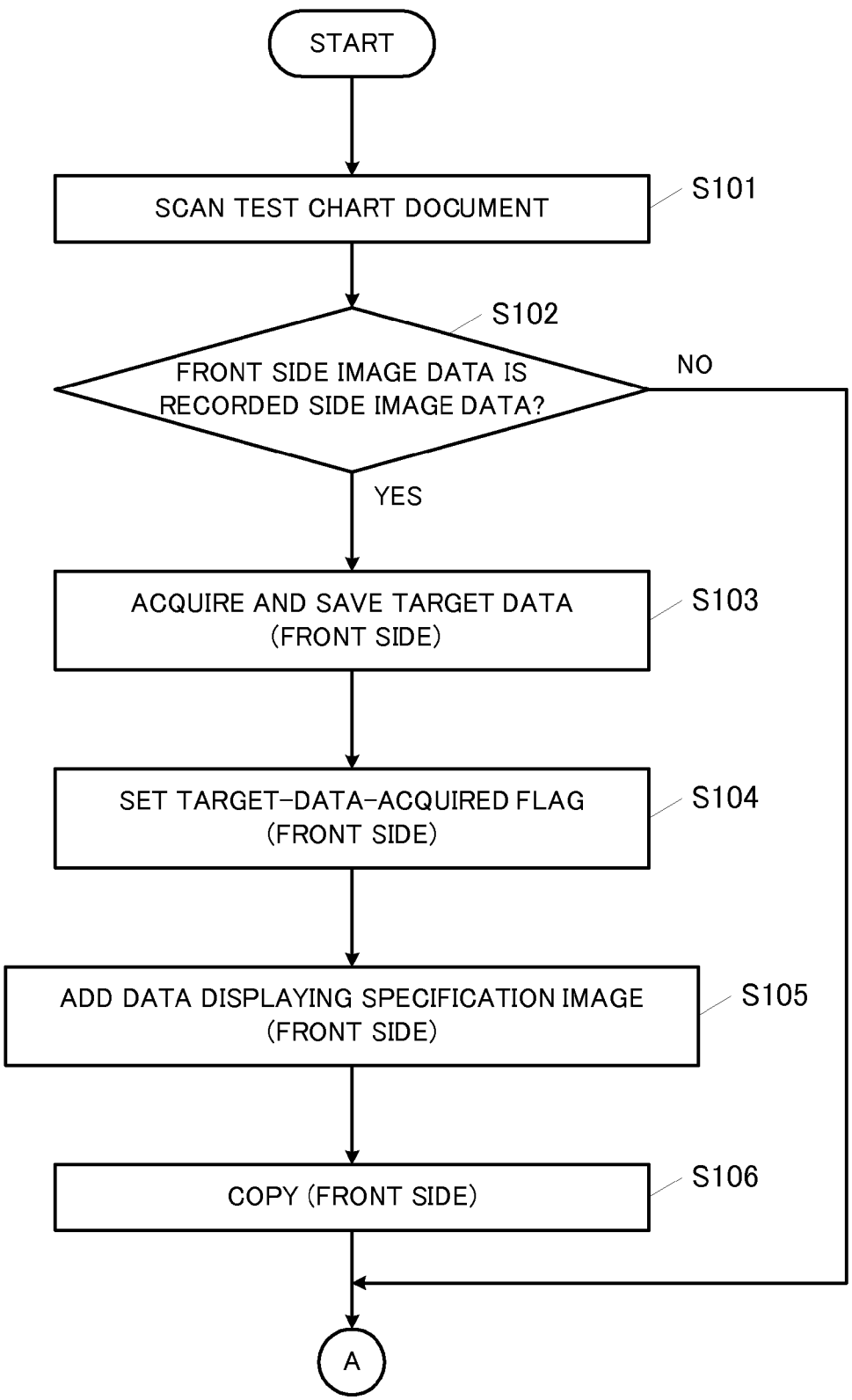
FIG. 3 is a flowchart of a process for acquiring target data.
Figure 4:
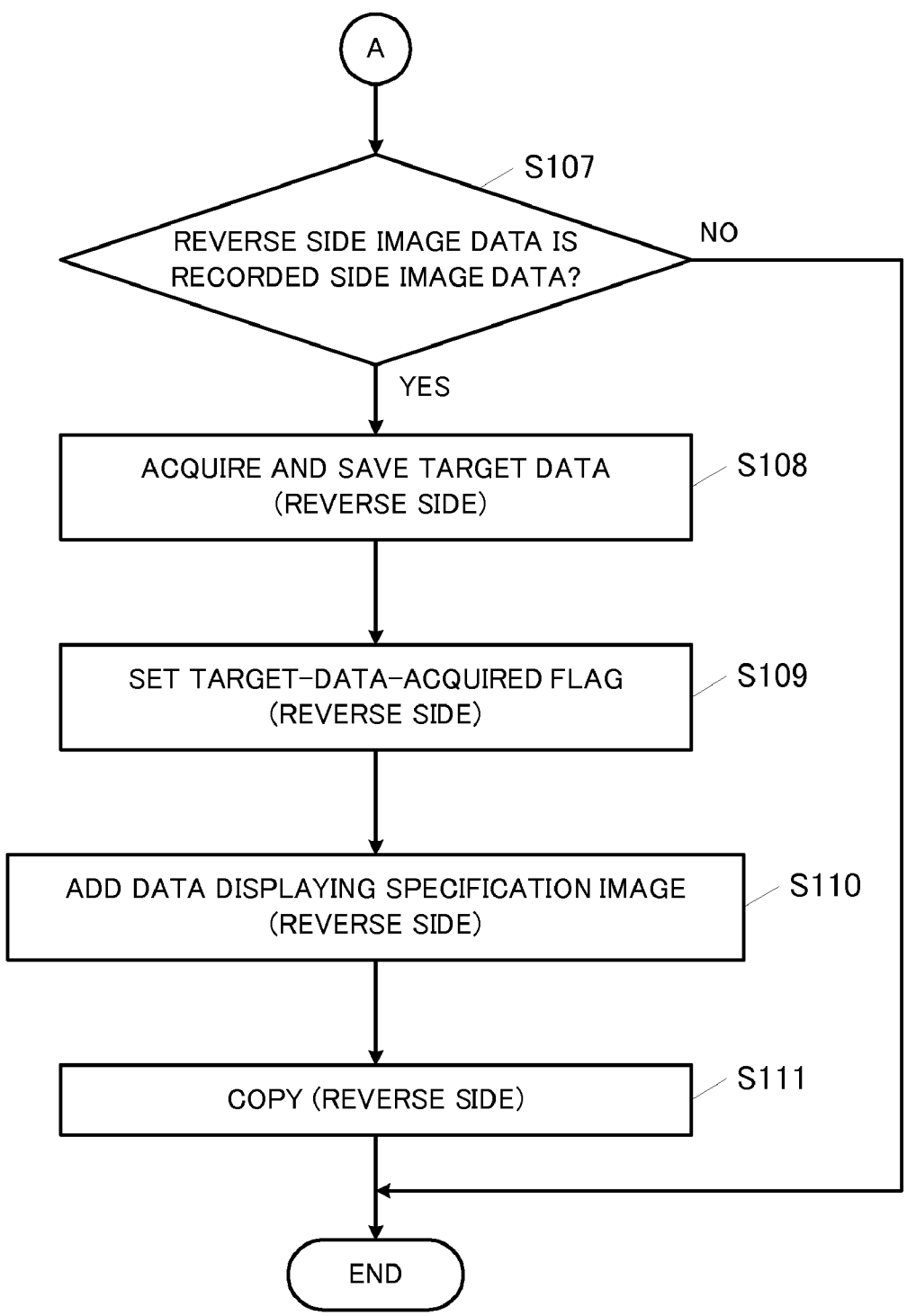
FIG. 4 is a flowchart of a process for acquiring the target data.

FIG. 3 and FIG. 4 are flowcharts of a process for acquiring the target data by the digital multifunction peripheral 1 carried out under the control of the integrated computer 10.

In the digital multifunction peripheral 1, the scanner 108 scans a front side and a reverse side of the test chart document as a first step for acquiring the target data (step S101).

Subsequently, the digital multifunction peripheral 1 inspects whether or not the image data of the front side generated by the front side scanning unit 1081 (hereinafter, referred to as "front side scanned data") is the image data of the test chart recorded side (hereinafter referred to as "recorded side image data") (step S102).

Then, when the front side scanned data is not the recorded side image data ("NO" in step S102), the digital multifunction peripheral 1 cannot acquire the target data from the front side scanned data, and hence skips the process from step S103 to step S106 and carries out the process in step S107.

In contrast, when the front side scanned data is the recorded side image data ("YES" in step S102), the digital multifunction peripheral 1 acquires the target data from the front side scanned data, saves the data in the flash memory 106 (step S103), and sets a target-data-acquired flag for the front side (step S104).

Then, the digital multifunction peripheral 1 adds data displaying a specification image to the front side scanned data (step S105). The data added here preferably includes data displaying a specification image specifying that the scanning unit that has scanned the test chart recorded side is the front side scanning unit 1081, data displaying a specification image specifying the date and time when the test chart recorded side was scanned, and data displaying a specification image specifying an image scanning unit of the digital multifunction peripheral 1 that has scanned the test chart recorded side.

Figure 5:
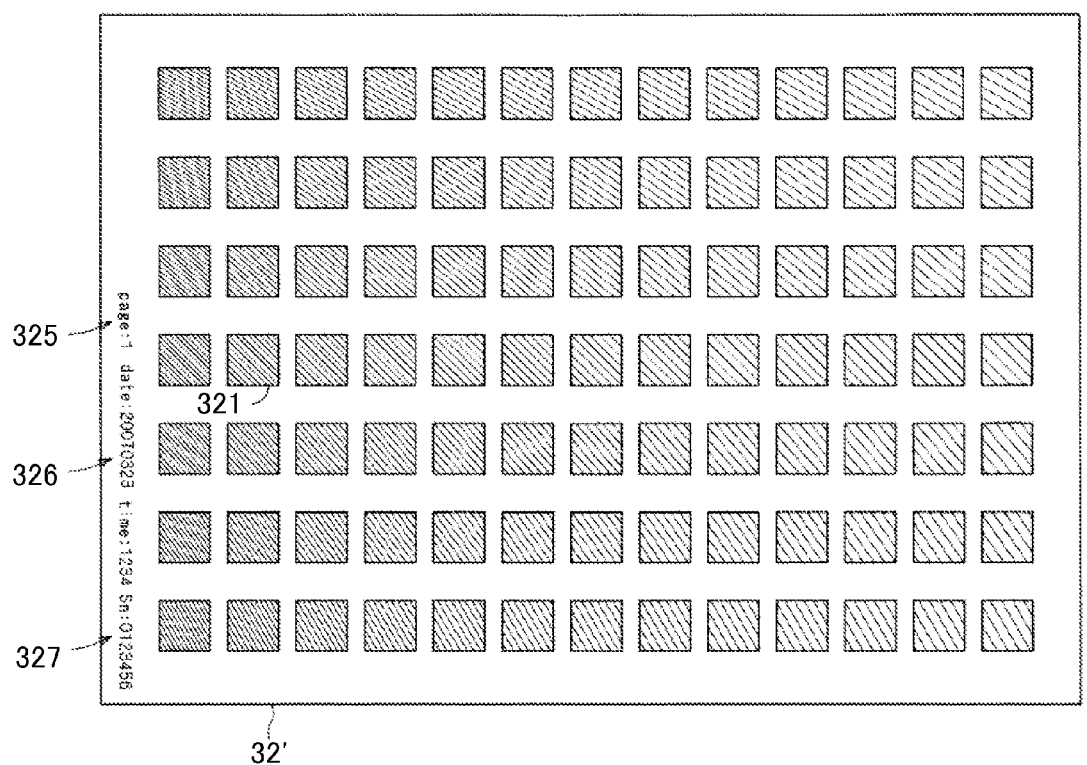
FIG. 5 illustrates an example of a copy of a test chart recorded side.

Subsequently, in the digital multifunction peripheral 1, the printer 110 forms the image on the recording medium in accordance with the front side scanned data, so that the copy of the test chart recorded side is acquired (step S106). The copy includes the above-described specification images as well as the test chart. For example, the test chart copied side of the copy 32' exemplified in FIG. 5 includes specification images 325 through 327. The specification image 325 includes a character string "page: 1", which shows that the scanning unit that has scanned the test chart recorded side is the front side scanning unit 1081. The specification image 326 includes character strings "date: 20070323" and "time: 1234", which show the date and time when the test chart recorded side was scanned. The specification image 327 includes a character string "sn: 0123456", which shows a serial number of the digital multifunction peripheral 1 that has scanned the test chart recorded side. It is also possible to use a one-dimensional code image or a two-dimensional code image, etc., instead of the specification images 325 through 327. These three specification images may be integrated into one, or the images may be formed at different positions and still be used as the specification images.

Then, the digital multifunction peripheral 1 starts the same process as the front side for the reverse side. In other words, the digital multifunction peripheral 1 inspects whether or not the image data on the reverse side generated by the reverse side scanning unit 1082 (hereinafter, referred to as "reverse side scanned data") is the recorded side image data (step S107).

Then, when the reverse side scanned data is not the recorded side image data ("NO" in step S107), the digital multifunction peripheral 1 cannot acquire the target data from the reverse side scanned data, and hence ends the process without carrying out the process from step S108 to step S111.

In contrast, when the reverse side scanned data is the recorded side image data ("YES" in step S107), the digital multifunction peripheral 1 acquires the target data from the reverse side scanned data, saves the data in the flash memory 106 (step S108), and sets a target-data-acquired flag for the reverse side (step S109).

Then, the digital multifunction peripheral 1 adds data displaying a specification image to the reverse side scanned data (step S110). The data added here preferably includes, for example, data displaying a specification image specifying that the scanning unit that has scanned the test chart recorded side is the reverse side scanning unit 1082, data displaying a specification image specifying the date and time when the test chart recorded side was scanned, and data displaying a specification image specifying an image scanning unit of the digital multifunction peripheral 1 that has scanned the test chart recorded side.

Subsequently, in the digital multifunction peripheral 1, the printer 110 forms the image on the recording medium in accordance with the reverse side scanned data, so that the copy of the test chart recorded side is acquired (step S111). The copy is formed with the above-described specification images as well as the test chart.

With the process flow as described thus far, the digital multifunction peripheral 1 can acquire the target data without carrying out complicated operations such as specifying the scanning unit for scanning the test chart recorded side. In particular, the target data for the front side and the reverse side are acquired quite easily by placing the test chart document having the test chart recorded side on the front side and the test chart document having the test chart recorded side on the reverse side on the document platen, and by having the scanner 108 scan consecutively by using the ADF 126.

4. Sampling Data Acquiring Mode

Figure 6:
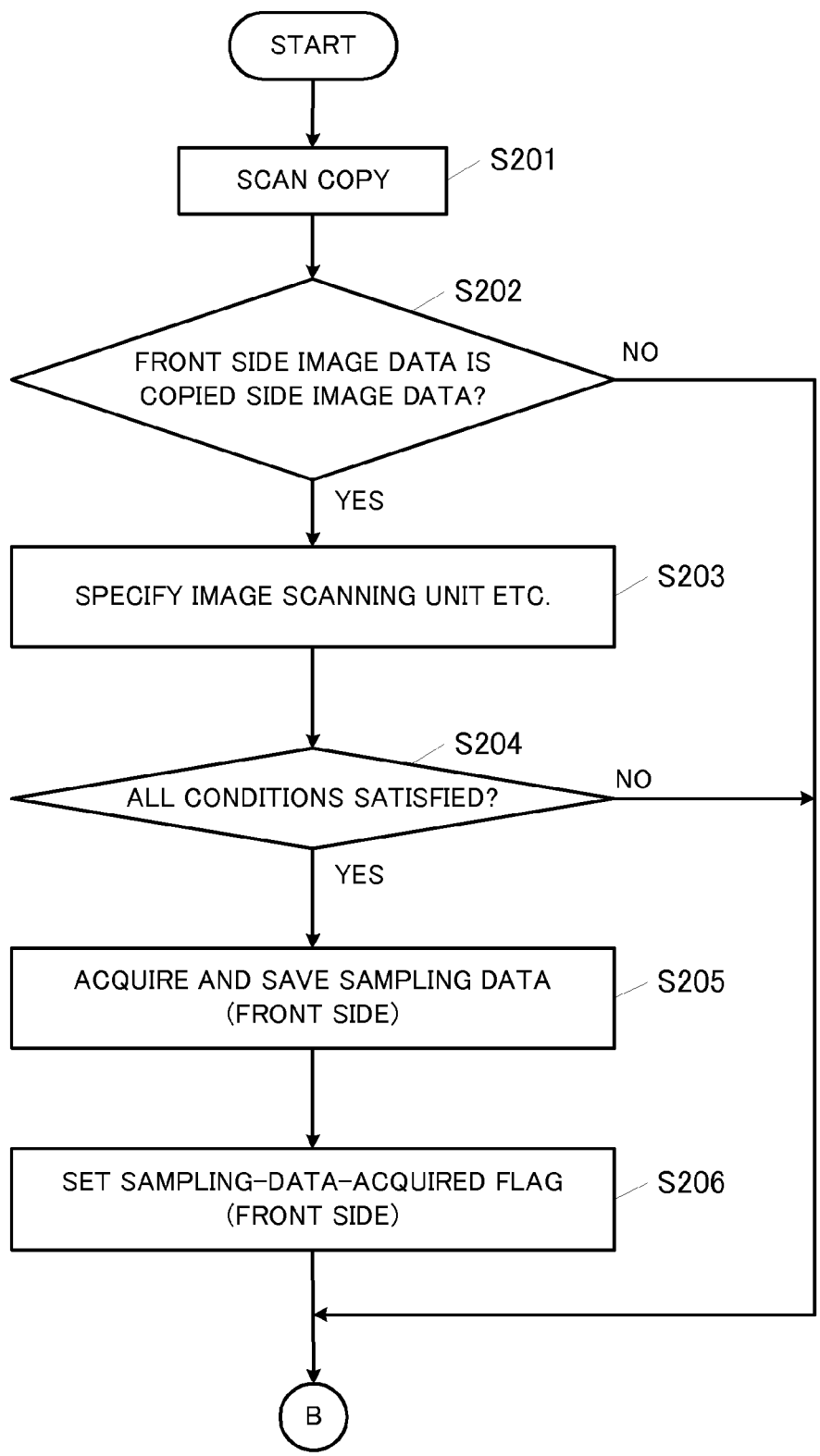
FIG. 6 is a flowchart of a process for acquiring sampling data.
Figure 7:
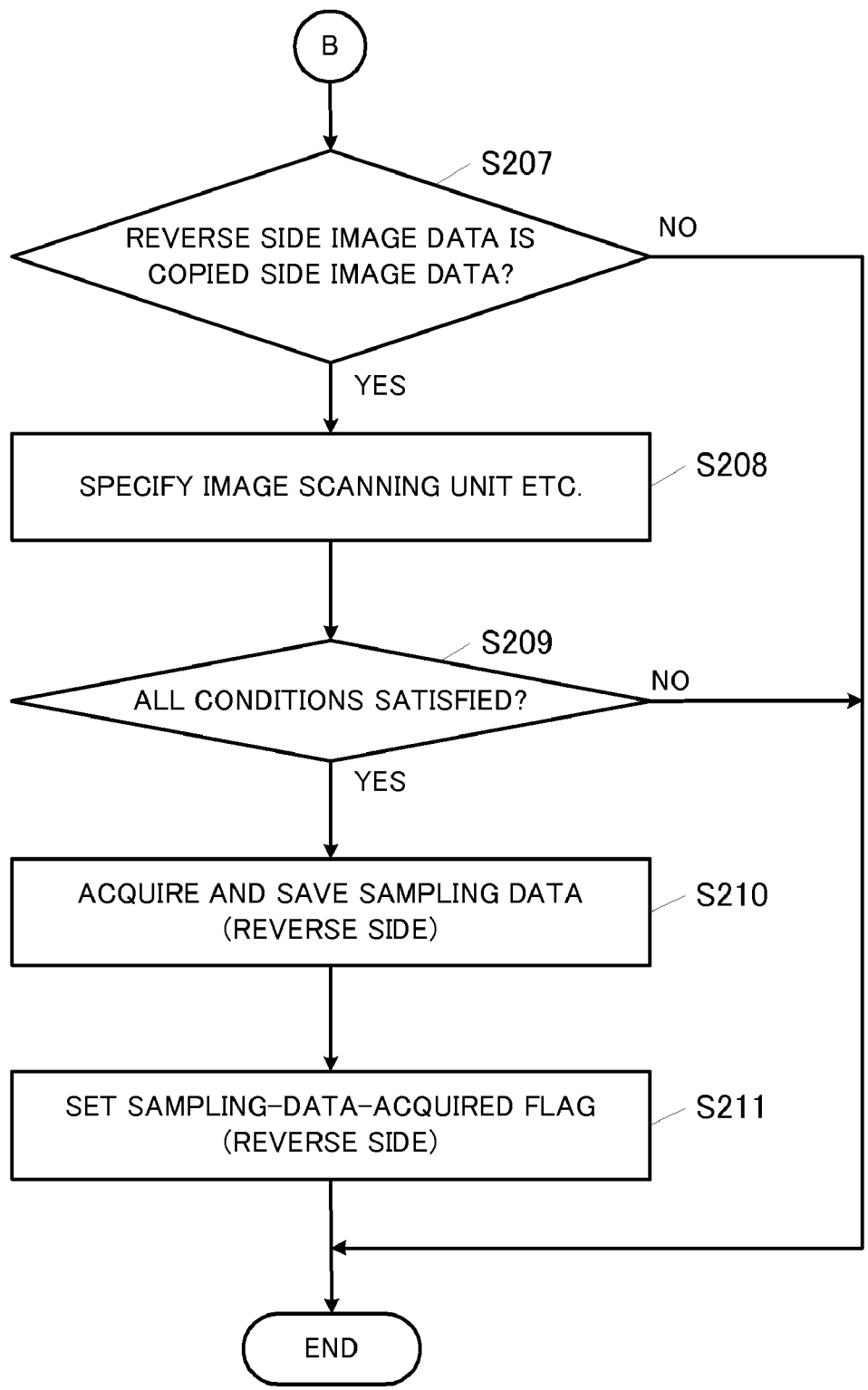
FIG. 7 is a flowchart of a process for acquiring the sampling data.

FIG. 6 and FIG. 7 are flowcharts of a process for acquiring the sampling data by the digital multifunction peripheral 1 carried out under the control of the integrated computer 10.

In the digital multifunction peripheral 1, the scanner 108 scans a front side and a reverse side of the copy acquired in steps S106 and S111 for acquiring the sampling data (step S201).

Subsequently, the digital multifunction peripheral 1 inspects whether or not the front side scanned data is the image data of the test chart copied side (hereinafter referred to as "copied side image data") (step S202).

Then, when the front side scanned data is not the copied side image data ("NO" in step S202), the digital multifunction peripheral 1 cannot acquire the sampling data from the front side scanned data, and hence skips the process from step S203 to step S206 and carries out the process in step S207.

In contrast, when the front side scanned data is the copied side image data ("YES" in step S202), the scanning unit that has scanned the test chart recorded side, the date and time when the test chart recorded side was scanned, and the image scanning unit of the digital multifunction peripheral 1 that has scanned the test chart recorded side, are specified from a portion of the specification images of the front side scanned data (step S203).

Subsequently, the digital multifunction peripheral 1 inspects whether or not the scanning unit that has scanned the test chart copied side matches the scanning unit specified in step S203. The digital multifunction peripheral 1 also inspects whether or not the number of days and time elapsed from the date and time specified in step S203 are within a predetermined standard (for example, within 24 hours). The digital multifunction peripheral 1 also inspects whether or not the image scanning unit of the digital multifunction peripheral 1 that has scanned the test chart copied side matches the image scanning unit of the digital multifunction peripheral 1 that has scanned the test chart copied side and has been specified in step S203 (step S204).

When all the conditions are satisfied ("YES" in step S204), the digital multifunction peripheral 1 acquires the sampling data from the front side scanned data, saves the data in the flash memory 106 as calibration data which serves as a basis for generating a correction table for the front side, described later (step S205), and sets the sampling-data-acquired flag for the front side (step S206). In contrast, when all the conditions are not satisfied, that is, when there exists an unsatisfied condition(s) ("NO" in step S204), the process from step S205 to S206 is skipped, and the process in step S207 is carried out. This is because the adequate sampling data cannot be acquired when the scanning unit that has scanned the test chart recorded side does not match the scanning unit that has scanned the test chart copied side, when the time elapsed from the time when the test chart recorded side was scanned is too long, or when the image scanning unit of the digital multifunction peripheral 1 that has scanned the test chart recorded side does not match the image scanning unit of the digital multifunction peripheral 1 that has scanned the test chart copied side.

Subsequently, the digital multifunction peripheral 1 starts the same process as the front side for the reverse side. In other words, the digital multifunction peripheral 1 inspects whether or not the reverse side scanned data is the copied side image data (step S207).

The digital multifunction peripheral 1 cannot acquire the sampling data from the reverse side scanned data when the reverse side scanned data is not the copied side image data ("NO" in step S207), and hence skips the process from step S208 to S211 and ends the process.

In contrast, when the reverse side scanned data is the copied side image data ("YES" in step S207), the scanning unit that has scanned the test chart recorded side, the date and time when the test chart recorded side was scanned, and the image scanning unit of the digital multifunction peripheral 1 that has scanned the test chart recorded side, are specified from the portion of the reverse side scanned data of the specification images (step S208).

Subsequently, the digital multifunction peripheral 1 inspects whether or not the scanning unit that has scanned the test chart copied side matches the scanning unit specified in step S208. The digital multifunction peripheral 1 also inspects whether or not the number of days and time elapsed from the date and time specified in step S208 are within the predetermined standard (for example, within 24 hours). The digital multifunction peripheral 1 also inspects whether or not the image scanning unit of the digital multifunction peripheral 1 that has scanned the test chart copied side matches the image scanning unit of the digital multifunction peripheral 1 that has scanned the test chart copied side specified in step S208 (step S209). When all the conditions are satisfied ("YES" in step S209), the digital multifunction peripheral 1 acquires the sampling data from the reverse side scanned data, saves the data in the flash memory 106 as the calibration data which serves as a basis for generating a correction table for the reverse side, described later (step S210), and sets a sampling-data-acquired flag for the reverse side (step S211). In contrast, when all the conditions are not satisfied, that is, when there exists an unsatisfied condition(s) ("NO" in step S209), the process from step S210 to S211 is skipped, and the process is ended. This is because the adequate sampling data cannot be acquired when the scanning unit that has scanned the test chart recorded side does not match the scanning unit that has scanned the test chart copied side, when the time elapsed from the time when the test chart recorded side was scanned is too long, or when the image scanning unit of the digital multifunction peripheral 1 that has scanned the test chart recorded side does not match the image scanning unit of the digital multifunction peripheral 1 that has scanned the test chart copied side.

5. Copy of a Normal Document

Figure 8:
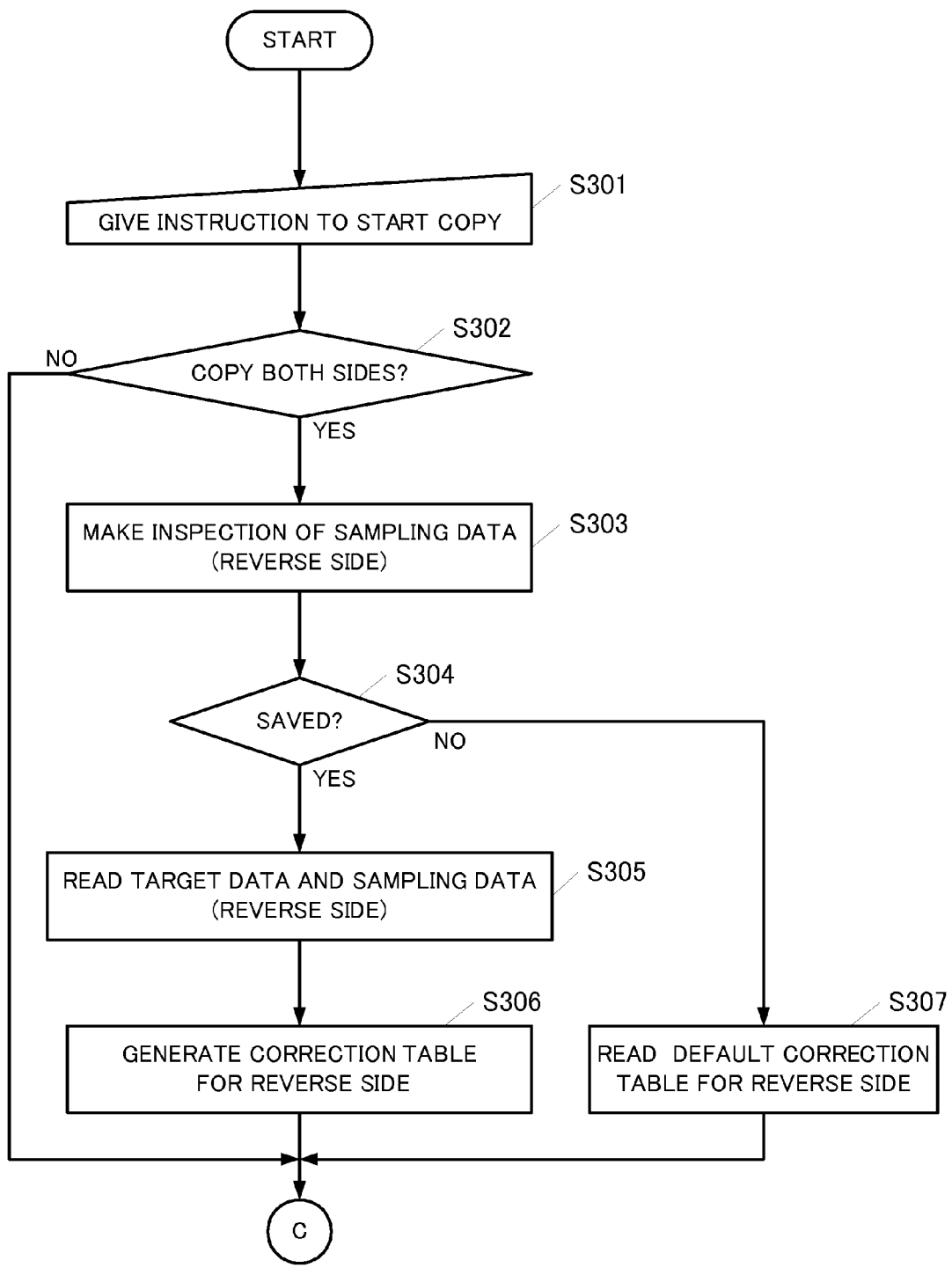
FIG. 8 is a flowchart of a process for copying a normal document.
Figure 9:
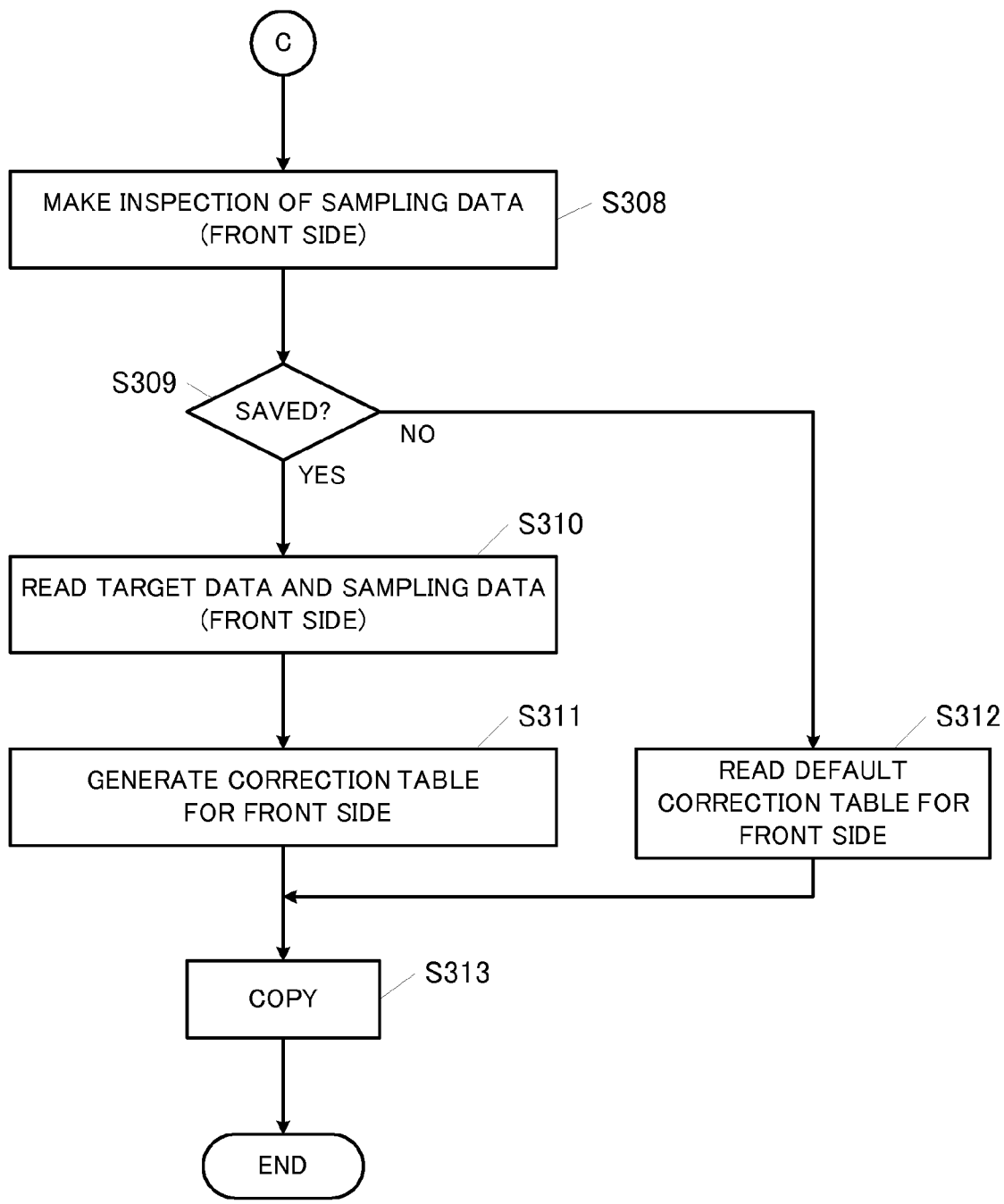
FIG. 9 is a flowchart of a process for copying the normal document.

FIG. 8 and FIG. 9 are flowcharts of a process for copying a normal document by the digital multifunction peripheral 1 carried out under the control of the integrated computer 10.

When copying the normal document, the user presses a start button on the operating panel 124 to give an instruction to start copying to the digital multifunction peripheral 1 (Step S301).

Subsequently, when copying both sides of the document ("YES" in step S302), the digital multifunction peripheral 1 inspects whether or not the sampling data for the reverse side is saved in the flash memory 106 (step S303). If the data is saved ("YES" in step S304), the digital multifunction peripheral 1 reads the target data and the sampling data relating to the reverse side from the flash memory 106 (step S305), and generates the correction table for the reverse side from the read target data and the sampling data (step S306). In contrast, when the data is not saved ("NO" in step S304), the digital multifunction peripheral 1 reads an already prepared, default correction table for the reverse side from the flash memory 106 (step S307). When copying only one side ("NO" in step S302), the digital multifunction peripheral 1 skips the process from step S303 to S307 and carries out the process in step S308.

Subsequently, the digital multifunction peripheral 1 starts the same process as the reverse side for the front side. In other words, the digital multifunction peripheral 1 inspects whether or not the sampling data relating to the front side is saved in the flash memory 106 (step S308). If the data is saved ("YES" in step S309), the digital multifunction peripheral 1 reads the target data and the sampling data relating to the front side from the flash memory 106 (step S310), and generates a correction table for the front side from the read target data and the sampling data (step S311). In contrast, when the data is not saved ("NO" in step S309), the digital multifunction peripheral 1 reads an already prepared, default correction table for the front side from the flash memory 106 (step S312).

Subsequently, the digital multifunction peripheral 1 corrects the image data on the basis of the correction tables or the default correction tables for the front side and the reverse side, and copies the document to the recording medium (step S313).

As described above, the sampling data is saved in the flash memory 106 only when the scanning unit that has scanned the test chart copied side matches the scanning unit specified in steps S203 and S208, the elapsed days and time from the date and time specified in steps S203 and S208 are within the predetermined standard, and the image scanning unit of the digital multifunction peripheral 1 that has scanned the test chart copied side matches the image scanning unit of the digital multifunction peripheral 1 that has been specified in Steps S203 and S208 and has scanned the test chart copied side. Therefore, the digital multifunction peripheral 1 carries out the correction of the image data for copying, on the basis of the correction table generated from the sampling data and the target data only when these conditions are satisfied. In other words, the digital multifunction peripheral 1 is able to adequately carry out the calibration without requiring complicated operations, and is able to reproduce the colors of the document faithfully with either one of the front side scanning unit 1081 and the reverse side scanning unit 1082. In particular, the colors of the document are adequately reproduced irrespective of the scanning unit even when the scanning system is different between the front side scanning unit 1081 and the reverse side scanning unit 1082, for example, even when the front side scanning unit 1081 uses a Charge Coupled Device (CCD) system to scan and the reverse side scanning unit 1082 uses a Contact Image Sensor (CIS) system to scan.

6. Other Preferred Embodiments

In the above-described preferred embodiments, the case in which the present invention is applied to the digital multifunction peripheral 1 having a copying function has been described. However, the present invention may be applied to an image copying machine, such as a machine specifically arranged for copying.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:
1. An image copying apparatus comprising:
    an image scanning unit including a first scanning unit arranged to scan a first side of a document and generate image data, and a second scanning unit arranged to scan a second side of the document and generate image data;
    an image forming unit arranged to form an image on a recording medium in accordance with the image data generated by the image scanning unit;
    a target data acquiring unit arranged to acquire target data from recorded side image data generated by the image scanning unit by scanning a test chart recorded side of a test chart document;
    a target data saving unit arranged to save the target data;
    an adding unit arranged to add data displaying a specification image specifying which scanning unit of the first and second scanning units has scanned the test chart recorded side to the recorded side image data;
    a sampling data acquiring unit arranged to acquire sampling data from copied side image data generated by the image scanning unit by scanning a test chart copied side of a copy of the test chart document including the specification image added to the recorded side image data;
    a specifying unit arranged to specify which scanning unit of the first and second scanning units has scanned the test chart recorded side based on a portion of the specification image of the copied side image data;
    a sampling data saving unit arranged to save, when the scanning unit that has scanned the test chart copied side matches the scanning unit specified by the specifying unit, the sampling data acquired by the sampling data acquiring unit; and
    a correcting unit arranged to correct the image data generated when a normal document is copied on the basis of a correcting feature generated from the target data saved in the target data saving unit and the sampling data saved in the sampling data saving unit.
2. The image copying apparatus according to claim 1, wherein the sampling data acquiring unit does not acquire the sampling data when the scanning unit which has scanned the test chart copied side does not match the scanning unit specified by the specifying unit.
3. The image copying apparatus according to claim 1, wherein the adding unit adds data displaying a specification image specifying the date and time when the test chart recorded side was scanned to the recorded side image data;
    the specifying unit specifies the date and time when the test chart recorded side was scanned based on a portion of the specification image of the copied side image data; and
    the sampling data saving unit saves, when a number of days and time elapsed from the date and time specified by the specifying unit are within a predetermined standard, the sampling data acquired by the sampling data acquiring unit.
4. The image copying apparatus according to claim 3, wherein the sampling data acquiring unit does not acquire the sampling data when the days and time elapsed from the date and time specified by the specifying unit are not within the predetermined standard.

5. A method of correcting image data comprising:
a target data acquiring step of acquiring target data from recorded side image data generated by an image scanning unit by scanning a test chart recorded side of a test chart document;
a target data saving step of saving the target data;
an adding step of adding to the recorded side image data, data displaying a specification image specifying a scanning unit which has scanned the test chart recorded side, between a first scanning unit arranged to scan a first side of a document and generate image data and a second scanning unit arranged to scan a second side of the document and generate image data;
a sampling data acquiring step of acquiring sampling data from copied side image data generated by the image scanning unit by scanning a test chart copied side of a copy of the test chart document including the specification image added to the recorded side image data;
a specifying step of specifying the scanning unit of the first and second scanning units which has scanned the test chart recorded side based on a portion of the specification image of the copied side image data;
a sampling data saving step of saving, when the scanning unit which has scanned the test chart copied side matches the scanning unit specified in the specifying step, the sampling data acquired in the sampling data acquiring step; and
a correcting step of correcting the image data generated when a normal document is copied on the basis of a correcting feature generated from the target data saved in the target data saving step and the sampling data saved in the sampling data saving step.

6. The method of correcting according to claim 5, wherein in the sampling data acquiring step, the sampling data is not acquired when the scanning unit which has scanned the test chart copied side does not match the scanning unit specified in the specifying step.

7. The method of correcting according to claim 5, wherein in the adding step, data displaying a specification image specifying the date and time when the test chart recorded side was scanned is added to the recorded side image data;
in the specifying step, the date and time when the test chart recorded side was scanned are specified based on a portion of the specification image of the copied side image data; and
in the sampling data saving step, the sampling data acquired in the sampling data acquiring step is saved when a number of days and time elapsed from the date and time specified in the specifying step are within a predetermined standard.

8. The method of correcting according to claim 7, wherein in the sampling data acquiring step, the sampling data is not acquired when the days and time elapsed from the date and time specified in the specifying step are not within the predetermined standard.

* * * * *